United States Patent [19]

Sakai et al.

[11] Patent Number: 5,180,767
[45] Date of Patent: Jan. 19, 1993

[54] FLAME RETARDANT CYCLIC OLEFINIC POLYMER COMPOSITION

[75] Inventors: Hideki Sakai; Yohzoh Yamamoto, both of Yamaguchi, Japan

[73] Assignee: Mitsui Petrochemical Industries, Ltd., Tokyo, Japan

[21] Appl. No.: 888,448

[22] Filed: May 28, 1992

Related U.S. Application Data

[63] Continuation of Ser. No. 450,465, Dec. 14, 1989, abandoned.

[30] Foreign Application Priority Data

Dec. 21, 1988 [JP] Japan ............... 63-322789

[51] Int. Cl.$^5$ ............................... C08K 3/10
[52] U.S. Cl. ........................ 524/411; 524/412; 524/518; 524/520; 525/97; 525/210; 525/211
[58] Field of Search ............... 524/411, 412, 518, 520; 525/97, 210, 211

[56] References Cited

U.S. PATENT DOCUMENTS 4,918,133  4/1990  Moriya et al. ............ 524/518

FOREIGN PATENT DOCUMENTS 0205833 12/1982 European Pat. Off. .
0156464 10/1985 European Pat. Off. .
  39911 10/1976 Japan .
 292601  6/1985 Japan .

Primary Examiner—Joseph L. Schofer
Assistant Examiner—Peter D. Mulcahy
Attorney, Agent, or Firm—Sherman and Shalloway

[57] ABSTRACT

A flame retardant cyclic olefinic polymer composition which comprises

[A]
(a) a cyclic olefinic random copolymer formed from an ethylenic component and a cyclic olefinic component represented by the following general formula [I], or
(b) a ring-opened polymer of a cyclic olefinic component represented by the following general formula [I] or a hydrogenated derivative of the polymer which copolymer or polymer has a limiting viscosity [$\eta$] of 0.01 to 10 dl/g measured in decalin at 135° C. and a softening temperature (TMA) of 70° C. or more;

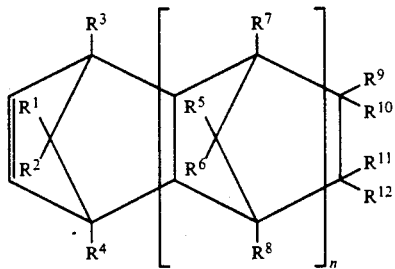

[B] a halogen type flame retardant,
[C] an antimony type flame retardant, and
[D] polytetrafluoroethylene, and if desired
[E] at least one copolymer selected from the amorphous or low crystalline alpha-olefinic copolymer which is formed from at least two alpha-olefins, and an amorphous or low crystalline copolymer which contains as one of monomer constituents styrene or its derivative and has at least one of glass transition temperatures of 0° C. or less, and if desired
[F] magnesium hydroxide.

12 Claims, No Drawings

FLAME RETARDANT CYCLIC OLEFINIC POLYMER COMPOSITION

This application is a continuation of application Ser. No. 07/450,465, filed Dec. 14, 1989.

The present invention relates to a flame retardant cyclic olefinic polymer composition which is excellent in heat resistance, chemicals resistance, solvent resistance, dielectric property, electrical properties, rigidity, dimensional stability, moldability and impact resistance, as well as mechanical properties such as flexural strength and flexural modulus, and moreover excellent in flame retardancy.

Polyolefinic resins such as polyethylene and polypropylene are widely utilized as resins excellent in chemicals resistance, solvent resistance and dielectric property. However, as polyolefinic resins are combustible, the use of them has been restricted from the viewpoint of safety for use in electrical parts, etc. where flame retardancy is strongly requested.

On the other hand, there have been known as compositions having an increased flame retardancy a fire-resistant composition comprising a propylene polymer, an organic bromine compound, antimony trioxide and a fluororesin (Japanese Patent Publication No. 39911/1976); a flame retardant polyolefin composition comprising a polyolefin, a flame retardant such as a halogen type flame retardant and antimony trioxide, and low molecular weight polytetrafluoroethylene powder (Japanese Laid-Open Patent Publication No. 162734/1982); a flame retardant resin composition comprising a thermoplastic resin, a flame retardant such as a halogen type flame retardant, a flame retardancy aid such as an antimony compound, an a fluororesin (Japanese Laid-Open Patent Publication No. 110257/1988); a flame retardant rubber-reinforced resin composition comprising a rubber-reinforced resin, a bromine type flame retardant, an antimony compound and a polytetrafluoroethylene having a particular molecular weight (Japanese Laid-Open Patent Publication No. 135442/1988); etc.

However, Japanese Patent Publication No. 39911/1976 discloses propylene polymers alone as the resins to be compounded in which the flame retardant is compounded, and this fire-resistant composition has a problem that it has only a low heat distortion temperature of 50° to 60° C. (according to ASTM D 648) and thus only a poor heat resistance.

Japanese Laid-Open Patent Publication No. 162734/1982 discloses examples wherein polyethylene alone is used as the resin to be compounded in which the flame retardant is compounded. However, flame retardant compositions using polyethylene as the resin to be compounded have a problem of poor heat resistance.

Japanese Laid-Open Patent Publication No. 110257/1988 only discloses examples wherein a polycarbonate resin (PC resin), acrylonitrile-butadiene-styrene copolymer (ABS resin) or acrylonitrile-styrene copolymer (AS resin) is used as the resin to be compounded in which the flame retardant is compounded. However, although flame retardant compositions using a PC resin as the resin to be compounded have a high heat distortion temperature and are thus excellent in heat resistance, they have problems that they are poor in moldability and electrical properties. Although flame retardant compositions using an ABS resin are excellent in moldability and electrical properties, they have a problem that they are poor in mechanical properties. Flame retardant composition using an AS resin have a problem that they are poor in moldabilty.

Japanese Laid-Open Patent Publication No. 135442/1988 also only discloses examples wherein an ABS resin or a mixture of an ABS resin and an AS resin is used as the resin to be compounded in which the flame retardant is compounded. It is also hard to say that these flame retardant compositions are excellent in balance of heat resistance, electrical properties, moldability, dimensional stability and mechanical properties, and thus these compositions also have both merits and demerites in properties.

Thus, there have not hitherto been obtained flame retardant compositions which are excellent in balance of all of heat resistance, electrical properties, moldability, dimensional stability and mechanical properties. Thus, there have been desired flame retardant compositions suitably utilizable in housings, parts and the like of electrical products, household appliances, OA apparatuses, etc. wherein flame retardancy, heat resistance and electrical properties are required and further moldability, dimensional stability and mechanical properties are requested.

On the other hand, there have been proposed in Japanese Laid-Open Patent Publication No. 26024/1985 as a resin having improved heat resistance and heat aging resistance a hydrogenated ring-opened polymer obtained by hydrogenating a ring-opened homopolymer of tetracyclo [$4,4,0,1^{2,5},1^{7,10}$]-3-dodecene However, this polymer has a problem that it is brittle and thus poor in impact resistance and also poor in flame retardancy.

Although Japanese Laid-Open patent Publication No. 292601/1986 discloses as a polymer to solve these problems a cyclic olefinic random copolymer composed of an ethylenic component and a cyclic olefinic component represented by the hereinafter-mentioned general formula [I], it is also desired about this polymer to enhance its flame retardancy.

The object of this invention is to solve the above problems accompanying the prior art, more specifically to provide a flame retardant cyclic olefinic polymer composition which is excellent on the one hand in flame retardancy and on the other hand in heat resistance, chemicals resistance, solvent resistance, dielectric property, rigidity, impact resistance, dimensional stability, moldability, mechanical properties such as flexural strength and flexural modulus, and the like.

The above object is accomplished according to this invention by (1) a flame retardant cyclic olefinic polymer composition which comprises

[A] (a) a cyclic olefinic random copolymer formed from an ethylenic component and a cyclic olefinic component represented by the following general formula [I], or (b) a ring-opened polymer of a cyclic olefinic component represented by the following general formula [I] or a hydrogenated derivative of the polymer
which copolymer or polymer has a limiting viscosity [$\eta$] of 0.01 to 10 dl/g measured in decalin at 135° C. and a softening temperature (TMA) of 70° C. or more;

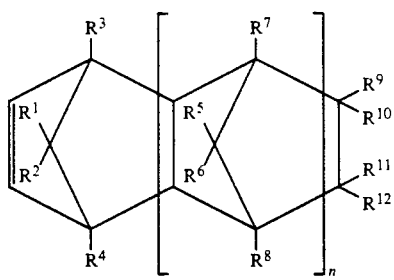

[I]

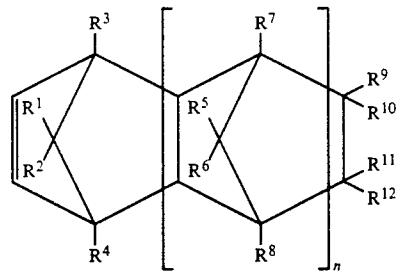

[I]

(wherein, $R^1$, to $R^{12}$ is a hydrogen atom, hydrocarbon group or halogen atom and may be the same or different; or $R^9$ and $R^{10}$, or $R^{11}$ and $R^{12}$ may combine to form a divalent hydrocarbon group, or $R^9$ or $R^{10}$ together with $R^{11}$ or $R^{12}$ may form a ring and n is 0 or a positive integer, and when $R^5$ to $R^8$ are plurally repeated, "n"s may be the same or different)

[B] a halogen type flame retardant,

[C] an antimony type flame retardant, and

[D] polytetrafluoroethylene, and wherein 3 to 50 wt. parts of [B] component, 1 to 30 wt. parts of [C] component and 0.01 to 5 wt. parts of [D] component are compounded per 100 wt. parts of [A] component.

The above object is also accomplished according to this invention by (2) the flame retardant cyclic olefinic polymer composition described in the above (1) which further contains

[E] at least one copolymer selected from an amorphous or low crystalline alpha-olefinic copolymer which is formed from at least two alpha-olefins, and an amorphous or low crystalline copolymer which contains as one of monomer constituents styrene or its derivative and has at least one of glass transition temperatures of 0° C. or less, and wherein 5 to 100 wt. parts of [E] component is compounded per 100 wt. parts of [A] component.

The above object is further accomplished according to this invention by (3) the flame retardant cyclic olefinic polymer composition described in the above (1) or (2) which further contains

[F] magnesium hydroxide, and wherein 2 to 150 wt. parts of [F] component is compounded per 100 wt. parts of [A] component.

This invention relates to the following flame retardant cyclic olefinic polymer compositions: (1) A flame retardant cyclic olefinic polymer composition which comprises

[A] (a) a cyclic olefinic random copolymer formed from an ethylenic component and a cyclic olefinic component represented by the following general formula [I], or (b) a ring-opened polymer of a cyclic olefinic component represented by the following general formula [I] or a hydrogenated derivative of the polymer which copolymer or polymer has a limiting viscosity [$\eta$] of 0.01 to 10 dl/g measured in decalin at 135° C. and a softening temperature (TMA) of 70° C. or more:

(wherein, $R^1$ to $R^{12}$ is a hydrogen atom, hydrocarbon group or halogen atom and may be the same or different; or $R^9$ and $R^{10}$, or $R^{11}$ and $R^{12}$ may combine to form a divalent hydrocarbon group, or $R^9$ or $R^{10}$ together with $R^{11}$ or $R^{12}$ may form a ring and n is 0 or a positive integer, and when $R^5$ to $R^8$ are plurally repeated, "n"s may be the same or different)

[B] a halogen type flame retardant,

[C] an antimony type flame retardant, and

[D] polytetrafluoroethylene, and wherein 3 to 50 wt. parts of [B] component, 1 to 30 wt. parts of [C] component and 0.01 to 5 wt. parts of [D] component are compounded per 100 wt. parts of [A] component.

(2) The flame retardant cyclic olefinic polymer composition of the above (1), which further contains

[E] at least one copolymer selected from an amorphous or low crystalline alpha-olefinic copolymer which is formed from at least two alpha-olefins, and an amorphous or low crystalline copolymer which contains as one of monomer constituents styrene or its derivative and has at least one of glass transition temperatures of 0° C. or less, and wherein 5 to 100 wt. parts of [E] component is compounded per 100 wt. parts of [A] component.

(3) The flame retardant cyclic olefinic polymer composition of the above (1) or (2), which further contains

[F] magnesium hydroxide, and wherein 2 to 150 wt parts of [F] component is compounded per 100 wt. parts of [A] component.

The present invention is described in detail below.

[A] component used in the invention may be any of the above cyclic olefinic random copolymer (a) and the above ring-opened polymer or its hydrogenated derivative (b).

The cyclic olefinic random copolymer (a) as [A] component in the invention is a cyclic olefinic random copolymer composed of an ethylenic component and a specific cyclic olefinic component as monomer components. The above specific cyclic olefinic component is a cyclic olefin represented by the above general formula [I].

The specific cyclic olefinic component composing the cyclic olefinic random copolymer (a) in the invention is at least one cyclic olefin selected from the group consisting of the unsaturated monomers represented by the above general formula [I].

The cyclic olefin represented by the above general formula [I] mainly forms the repetition unit of structure represented by the following general formula [II] in the cyclic olefinic random copolymer (a):

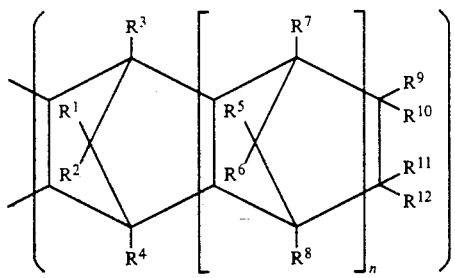

(wherein, n and $R^1$ to $R^{12}$ are as defined above).

Examples of $R^1$ to $R^8$ in the above general formula [I] include hydrogen atoms; halogen atoms such as fluorine, chlorine or bromine; lower alkyl groups such as methyl groups, ethyl groups, propyl groups or butyl groups, etc. They may be totally or partially different from each other, or all of them may be identical.

Examples of $R^9$ to $R^{12}$ in the above general formula [I] include hydrogen atoms; halogen atoms such as fluorine, chlorine or bromine; alkyl groups such as methyl groups, ethyl groups, propyl groups, isopropyl groups, butyl groups, isobutyl groups, hexyl groups or stearyl groups; cycloalkyl groups such as cyclohexyl groups. Further, $R^9$ and $R^{10}$, or $R^{11}$ and $R^{12}$ may combine to form a divalent hydrocarbon group, an $R^9$ or $R^{10}$ may form a ring together with $R^{11}$ or $R^{12}$.

Examples of the divalent hydrocarbon group which is formed by combination of $R^9$ and $R^{10}$, or $R^{11}$ and $R^{12}$ include alkylidene groups such as ethylidene, propylidene, and ispropylidene groups.

The ring which is formed from $R^9$ or $R^{10}$ together with $R^{11}$ or $R^{12}$ may be a monoring or condensed polyring, may be a polyring having crosslinking, may be a ring having unsaturated bond, or may be a ring composed of a combination of these rings.

There may specifically be mentioned as such rings, for example

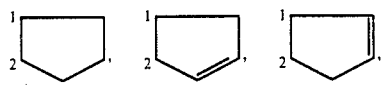

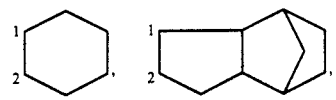

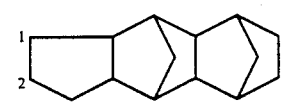

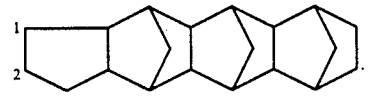

These rings may have substituents such as methyl group. The carbon atom to which the number 1 or 2 is attached in the above chemical formulae represents the carbon atom to which $R^9$ to $R^{12}$ are bound in the general formula [I].

The cyclic olefin represented by the general formula [I] can easily be prepared by condensing a cyclopentadiene with a corresponding olefin or cyclic olefin according to Diels-Alder reaction.

Specific examples of cyclic olefins represented by the general formula [I] include compounds disclosed in Table 1 and so on.

TABLE 1

| Chemical formula | Compound name |
|---|---|
| (structure) | Bicyclo[2.2.1]hept-2-ene |
| (structure with CH3) | 6-Methylbicyclo[2.2.1]hept-2-ene |
| (structure with 2 CH3) | 5,6-Dimethylbicyclo[2.2.1]-hept-2-ene |
| (structure with CH3) | 1-Methylbicyclo[2.2.1]hept-2-ene |
| (structure with C2H5) | 6-Ethylbicyclo[2.2.1]hept-2-ene |

TABLE 1-continued

| Chemical formula | Compound name |
|---|---|
| 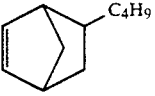 C$_4$H$_9$ | 6-Butylbicyclo[2.2.1]hept-2-ene |
| 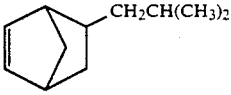 CH$_2$CH(CH$_3$)$_2$ | 6-Isobutylbicyclo[2.2.1]hept-2-ene |
|  CH$_3$ | 7-methylbicyclo[2.2.1]hept-2-ene |
| 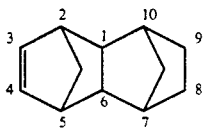 | Tetracyclo[4.4.0.1$^{2,5}$.1$^{7,10}$]-3-dodecene |
|  CH$_3$ | 8-Methyltetracyclo[4.4.0.1$^{2,5}$.1$^{7,10}$]-3-dodecene |
| 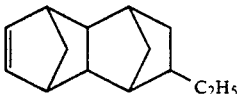 C$_2$H$_5$ | 8-Ethyltetracyclo[4.4.0.1$^{2,5}$.1$^{7,10}$]-3-dodecene |
| 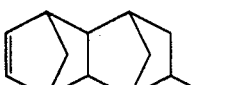 C$_3$H$_7$ | 8-Propyltetracyclo[4.4.0.1$^{2,5}$.1$^{7,10}$]-3-dodecene |
| 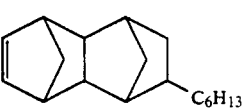 C$_6$H$_{13}$ | 8-Hexyltetracyclo[4.4.0.1$^{2,5}$.1$^{7,10}$]-3-dodecene |
| 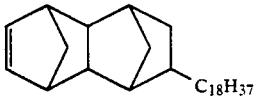 C$_{18}$H$_{37}$ | 8-Stearyltetracyclo[4.4.0.1$^{2,5}$.1$^{7,10}$]-3-dodecene |
| 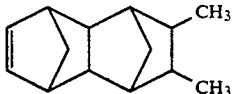 CH$_3$ CH$_3$ | 8,9-Dimethyltetracyclo[4.4.0.1$^{2,5}$.1$^{7,10}$]-3-dodecene |
| 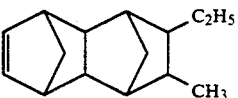 C$_2$H$_5$ CH$_3$ | 8-Methyl-9-ethyltetracyclo[4.4.0.1$^{2,5}$.1$^{7,10}$]-3-dodecene |
| 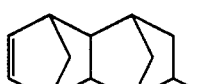 Cl | 8-Chlorotetracyclo[4.4.0.1$^{2,5}$.1$^{7,10}$]-3-dodecene |
| 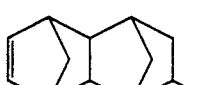 Br | 8-Bromotetracyclo[4.4.0.1$^{2,5}$.1$^{7,10}$]-3-dodecene |

TABLE 1-continued

| Chemical formula | Compound name |
|---|---|
| [structure with F] | 8-Fluorotetracyclo[4.4.0.1$^{2,5}$.1$^{7,10}$]-3-dodecene |
| [structure with two Cl] | 8,9-Dichlorotetracyclo[4.4.0.1$^{2,5}$.1$^{7,10}$]-3-dodecene |
| [structure with cyclohexyl] | 8-Cyclohexyltetracyclo[4.4.0.1$^{2,5}$.1$^{7,10}$]-3-dodecene |
| [structure with CH$_2$CH(CH$_3$)$_2$] | 8-Isobutyltetracyclo[4.4.0.1$^{2,5}$.1$^{7,10}$]-3-dodecene |
| [structure with C$_4$H$_9$] | 8-Butyltetracyclo[4.4.0.1$^{2,5}$.1$^{7,10}$]-3-dodecene |
| [structure with =CH—CH$_3$] | 8-Ethylidenetetracyclo[4.4.0.1$^{2,5}$.1$^{7,10}$]-3-dodecene |
| [structure with CH$_3$ and =CH—CH$_3$] | 8-Ethylidene-9-methyltetracyclo[4.4.0.1$^{2,5}$.1$^{7,10}$]-3-dodecene |
| [structure with C$_2$H$_5$ and =CH—CH$_3$] | 8-Ethylidene-9-ethyltetracyclo[4.4.0.1$^{2,5}$.1$^{7,10}$]-3-dodecene |
| [structure with CH(CH$_3$)$_2$ and =CH—CH$_3$] | 8-Ethylidene-9-isopropyltetracyclo[4.4.0.1$^{2,5}$.1$^{7,10}$]-3-dodecene |
| [structure with C$_4$H$_9$ and =CH—CH$_3$] | 8-Ethylidene-9-butyltetracyclo[4.4.0.1$^{2,5}$.1$^{7,10}$]-3-dodecene |
| [structure with =CH—CH$_2$—CH$_3$] | 8-n-Propylidenetetracyclo[4.4.0.1$^{2,5}$.1$^{7,10}$]-3-dodecene |
| [structure with CH$_3$ and =CH—CH$_2$—CH$_3$] | 8-n-Propylidene-9-methyltetracyclo[4.4.0.1$^{2,5}$.1$^{7,10}$]-3-dodecene |
| [structure with C$_2$H$_5$ and =CH—CH$_2$—CH$_3$] | 8-n-Propylidene-9-ethyltetracyclo[4.4.0.1$^{2,5}$.1$^{7,10}$]-3-dodecene |

TABLE 1-continued

| Chemical formula | Compound name |
| --- | --- |
|  | 8-n-Propylidene-9-isopropyltetracyclo[4.4.0.1$^{2,5}$.1$^{7,10}$]-3-dodecene |
|  | 8-n-Propylidene-9-butyltetracyclo[4.4.0.1$^{2,5}$.1$^{7,10}$]-3-dodecene |
|  | 8-Isopropylidenetetracyclo[4.4.0.1$^{2,5}$.1$^{7,10}$]-3-dodecene |
|  | 8-Isopropylidene-9-methyltetracyclo[4.4.0.1$^{2,5}$.1$^{7,10}$]-3-dodecene |
|  | 8-Isopropylidene-9-ethyltetracyclo[4.4.0.1$^{2,5}$.1$^{7,10}$]-3-dodecene |
|  | 8-Isopropylidene-9-isopropyltetracyclo[4.4.0.1$^{2,5}$.1$^{7,10}$]-3-dodecene |
|  | 8-Isopropylidene-9-butyltetracyclo[4.4.0.1$^{2,5}$.1$^{7,10}$]-3-dodecene |
|  | 5,10-Dimethyltetracyclo[4.4.0.1$^{2,5}$.1$^{7,10}$]-3-dodecene |
|  | 2,10-Dimethyltetracyclo[4.4.0.1$^{2,5}$.1$^{7,10}$]-3-dodecene |
|  | 11,12-Dimethyltetracyclo[4.4.0.1$^{2,5}$.1$^{7,10}$]-3-dodecene |

TABLE 1-continued

| Chemical formula | Compound name |
| --- | --- |
| | 2,7,9-Trimethyltetracyclo[4.4.0.1$^{2,5}$.1$^{7,10}$]-3-dodecene |
| | 9-Ethyl-2,7-dimethyltetracyclo[4.4.0.1$^{2,5}$.1$^{7,10}$]-3-dodecene |
| | 9-Isobutyl-2,7-dimethyltetracyclo[4.4.0.1$^{2,5}$.1$^{7,10}$]-3-dodecene |
| | 9,11,12-Trimethyltetracyclo[4.4.0.1$^{2,5}$.1$^{7,10}$]-3-dodecene |
| | 9-Ethyl-11,12-dimethyltetracyclo[4.4.0.1$^{2,5}$.1$^{7,10}$]-3-dodecene |
| | 9-Isobutyl-11,12-dimethyltetracyclo[4.4.0.1$^{2,5}$.1$^{7,10}$]-3-dodecene |
| | 5,8,9,10-Tetramethyltetracyclo[4.4.0.1$^{2,5}$.1$^{7,10}$]-3-dodecene |
| | Hexacyclo[6.6.1.1$^{3,6}$.1$^{10,13}$.0$^{2,7}$.0$^{9,14}$]-4-heptadecene |
| | 12-Methylhexacyclo[6.6.1.1$^{3,6}$.1$^{10,13}$.0$^{2,7}$.0$^{9,14}$]-4-heptadecene |
| | 12-Ethylhexacyclo[6.6.1.1$^{3,6}$.1$^{10,13}$.0$^{2,7}$.0$^{9,14}$]-4-heptadecene |

TABLE 1-continued

| Chemical formula | Compound name |
|---|---|
| | 12-Isobutylhexacyclo[6.6.1.1$^{3,6}$.1$^{10,13}$.0$^{2,7}$.0$^{9,14}$]-4-heptadecene |
| | 1,6,10-Trimethyl-12-isobutylhexacyclo[6.6.1.1$^{3,6}$.1$^{10,13}$.0$^{2,7}$.0$^{9,14}$]-4-heptadecene |
| | Octacyclo[8.8.0.1$^{2,9}$.1$^{4,7}$.1$^{11,18}$.1$^{13,16}$.0$^{3,8}$.0$^{12,17}$]-5-docosene |
| | 15-Methyloctacyclo[8.8.0.1$^{2,9}$.1$^{4,7}$.1$^{11,18}$.1$^{13,16}$.0$^{3,8}$.0$^{12,17}$]-5-docosene |
| | 15-Ethyloctacylco[8.8.0.1$^{2,9}$.1$^{4,7}$.1$^{11,18}$.1$^{13,16}$.0$^{3,8}$.0$^{12,17}$]-5-docosene |
| | Pentacyclo[6.6.1.1$^{3,6}$.0$^{2,7}$.0$^{9,14}$]-4-hexadecene |
| | 1,3-Dimethylpentacyclo[6.6.1.1$^{3,6}$.0$^{2,7}$.0$^{9,14}$]-4-hexadecene |
| | 1,6-Dimethylpentacyclo[6.6.1.1$^{3,6}$.0$^{2,7}$.0$^{9,14}$]-4-hexadecene |
| | 15,16-Dimethylpentacyclo[6.6.1.1$^{3,6}$.0$^{2,7}$.0$^{9,14}$]-4-hexadecene |
| | Pentacyclo[6.5.1.1$^{3,6}$.0$^{2,7}$.0$^{9,13}$]-4-pentadecene |
| | 1,3-Dimethylpentacyclo[6.5.1.1$^{3,6}$.0$^{2,7}$0$^{9,13}$]-4-pentadecene |

TABLE 1-continued

| Chemical formula | Compound name |
|---|---|
| 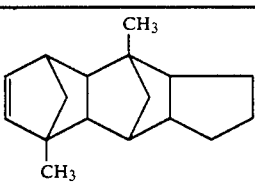 | 1,6-Dimethylpentacyclo[6.5.1.1$^{3,6}$.0$^{2,7}$.0$^{9,13}$]-4-pentadecene |
| 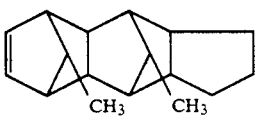 | 14,15-Dimethylpentacyclo[6.5.1.1$^{3,6}$.0$^{2,7}$.0$^{9,13}$]-4-pentadecene |
| 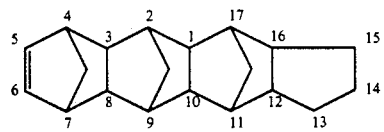 | Heptacyclo[8.7.0.1$^{2,9}$.1$^{4,7}$.1$^{11,17}$.0$^{3,8}$.0$^{12,16}$]-5-eicosene |
| 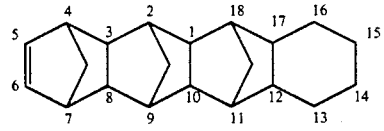 | Heptacyclo[8.8.0.1$^{2,9}$.1$^{4,7}$.1$^{11,18}$.0$^{3,8}$.0$^{12,17}$]-5-heneicosene |
| 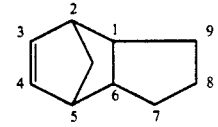 | Tricyclo[4.3.0.1$^{2,5}$]-3-decene |
| 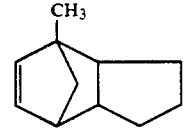 | 2-Methyltricyclo[4.3.0.1$^{2,5}$]-3-decene |
| 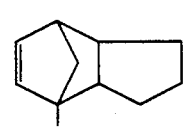 | 5-Methyltricyclo[4.3.0.1$^{2,5}$]-3-decene |
| 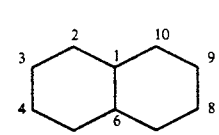 | Tricyclo[4.4.0.1$^{2,5}$]-3-undecene |
| 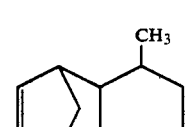 | 10-Methyltricyclo[4.4.0.1$^{2,5}$]-3-undecene |
| 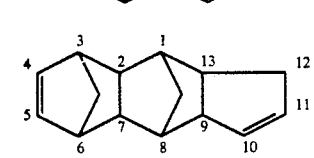 | Pentacyclo[6.5.1.1$^{3,6}$.0$^{2,7}$.0$^{9,13}$]-4,10-pentadecadiene |
| 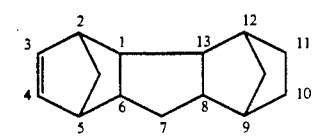 | Pentacyclo[4.7.0.1$^{2,5}$.0$^{8,13}$.1$^{9,12}$]-3-pentadecene |

TABLE 1-continued

| Chemical formula | Compound name |
|---|---|
| 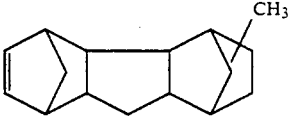 | Methyl-substituted pentacyclo[4.7.0.1$^{2,5}$.0$^{8,13}$.1$^{9,12}$]-3-pentadecene |
| 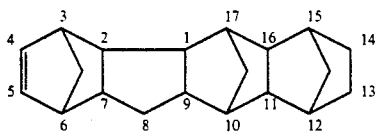 | Heptacyclo[7.8.0.1$^{3,6}$.0$^{2,7}$.1$^{10,17}$.0$^{11,16}$.1$^{12,15}$]-4-eicosene |
| 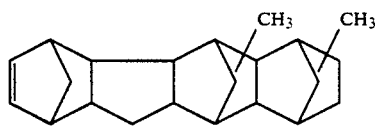 | Dimethyl-substituted heptacyclo[7.8.0.1$^{3,6}$.0$^{2,7}$.1$^{10,17}$.0$^{11,16}$.1$^{12,15}$]-4-eicosene |
| 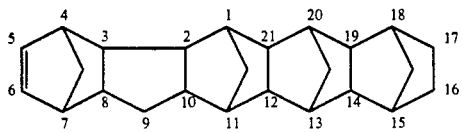 | Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene |
| 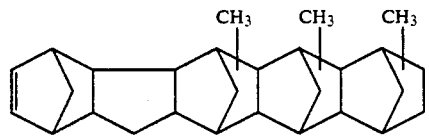 | Trimethyl-substituted nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene |

Although the cyclic olefinic random copolymer (a) in the invention contains an ethylene component and the above cyclic olefinic component as indispensable components, the copolymer may, if necessary, contain another copolymerizable unsaturated monomer component besides these two indispensable components in a range such that the object of the invention is not spoiled. Specific examples of the unsaturated monomer which may optionally be copolymerized include alpha-olefins having 3 to 20 carbon atoms such as propylene, 1-butene, 4-methyl-1-pantene, 1-hexene, 1-octene, 1-decene, 1-dodecene, 1-tetradecene, 1-hexadecene, 1-octadecene and 1-eicosene; cyclobutene, cyclopentene, cyclohexene, 3,4-dimethylcyclopentene, 3-methylcyclohexene, 2-(2-methylbutyl)-1-cyclohexene, styrene, alphamethylstyrene, dicyclopentadiene, ethylidenenorbornene, 2,3,3a,7a-tetrahydro-4,7-methano-1H-indene, etc., and the unsaturated monomer is used in an amount of less than moles of the ethylene component unit in the formed random copolymer.

In the cyclic olefinic random copolymer (a) of the invention, the amount of the structural unit derived from the ethylene component is suitably in the range of 10 to 90 mole %, preferably in the range of 50 to 75 mole %, and the amount of the structural unit derived from the cyclic olefinic component is suitably in the range of 10 to 90 mole %, preferably in the range of 25 to 50 mole %. The structural unit derived from the ethylenic component and the structural unit derived from the cyclic ofefinic component form a randomly arranged and substantially linear cyclic olefinic random copolymer. It can be ascertained by the fact that the above cyclic olefinic random copolymer completely dissolves in decalin of 135 °C. that the the copolymer is substantially linear and does not have a gel-like crosslinking structure.

The limiting viscosity [η] of the cyclic olefinic random copolymer (a) composing the composition of the invention measured in decalin of 135° C. is in the range of 0.01 to 10 dl/g, preferably 0.05 to 5 dl/g, and the softening temperature (TMA) thereof measured by a thermomechanical analyzer is in the range of 70° C. or more, preferably 90° to 25° C. and more preferably 100° to 200° C.

It is preferred to use as the cyclic olefinic random copolymers (a) composing the composition of the invention those having a glass transition temperature (Tg) in the range of usually 50° to 230° C., preferably 70° to 210° C.; a crystallinity in the range of 0 to 10%, preferably 0 to 7%, particularly preferably 0 to 5% which is measured by the X-ray diffraction method; and a thermal decomposition temperature in the range of usually 350° to 420° C., preferably 370° to 400° C.

Further, it is prefered to use as the cyclic olefinic random copolymers (a) those having as their mechanical properties a flexural modulus in the range of usually $1 \times 10^4$ to $5 \times 10^4$ kg/cm$^2$ and a flexural yield strength in the range of usually 300 to 1500 kg/cm$^2$.

Further, it is preferred to use as the cyclic olefinic random copolymers (a) those having a density in the range of usually 0.86 to 1.10 g/cm$^3$, preferably 0.88 to 1.08 g/cm$^3$; a refractive index (ASTM D 542) in the range of usually 1.47 to 1.58, preferably 1.48 to 1.56; and in respect of the copolymers being substantially amorphous a haze (ASTM D 1003) of usually 20% or less, preferably 10% or less.

Further, it is preferred to use as the cyclic olefinic random copolymer (a) those having as their electrical properties a dielectric constant (ASTM D 150) (1 kHz) in the range of 1.5 to 3.0, preferably 1.9 to 2.6, and a dielectric loss tangent in the range of $9 \times 10^{-4}$ to $8 \times 10^{-5}$, preferably $3 \times 10^{-4}$ to $9 \times 10^{-5}$.

TABLE 1-continued

| Chemical formula | Compound name |
|---|---|
| (structure with CH$_3$) | Methyl-substituted pentacyclo[4.7.0.1$^{2,5}$.0$^{8,13}$.1$^{9,12}$]-3-pentadecene |
| (structure, numbered 1-17) | Heptacyclo[7.8.0.1$^{3,6}$.0$^{2,7}$.1$^{10,17}$.0$^{11,16}$.1$^{12,15}$]-4-eicosene |
| (structure with two CH$_3$) | Dimethyl-substituted heptacyclo[7.8.0.1$^{3,6}$.0$^{2,7}$.1$^{10,17}$.0$^{11,16}$.1$^{12,15}$]-4-eicosene |
| (structure, numbered 1-21) | Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene |
| (structure with three CH$_3$) | Trimethyl-substituted nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene |

Although the cyclic olefinic random copolymer (a) in the invention contains an ethylene component and the above cyclic olefinic component as indispensable components, the copolymer may, if necessary, contain another copolymerizable unsaturated monomer component besides these two indispensable components in a range such that the object of the invention is not spoiled. Specific examples of the unsaturated monomer which may optionally be copolymerized include alpha-olefins having 3 to 20 carbon atoms such as propylene, 1-butene, 4-methyl-1-pantene, 1-hexene, 1-octene, 1-decene, 1-dodecene, 1-tetradecene, 1-hexadecene, 1-octadecene and 1-eicosene; cyclobutene, cyclopentene, cyclohexene, 3,4-dimethylcyclopentene, 3-methylcyclohexene, 2-(2-methylbutyl)-1-cyclohexene, styrene, alphamethylstyrene, dicyclopentadiene, ethylidenenorbornene, 2,3,3a,7a-tetrahydro-4,7-methano-1H-indene, etc., and the unsaturated monomer is used in an amount of less than moles of the ethylene component unit in the formed random copolymer.

In the cyclic olefinic random copolymer (a) of the invention, the amount of the structural unit derived from the ethylene component is suitably in the range of 10 to 90 mole %, preferably in the range of 50 to 75 mole %, and the amount of the structural unit derived from the cyclic olefinic component is suitably in the range of 10 to 90 mole %, preferably in the range of 25 to 50 mole %. The structural unit derived from the ethylenic component and the structural unit derived from the cyclic ofefinic component form a randomly arranged and substantially linear cyclic olefinic random copolymer. It can be ascertained by the fact that the above cyclic olefinic random copolymer completely dissolves in decalin of 135 °C. that the the copolymer is substantially linear and does not have a gel-like cross-linking structure.

The limiting viscosity [$\eta$] of the cyclic olefinic random copolymer (a) composing the composition of the invention measured in decalin of 135° C. is in the range of 0.01 to 10 dl/g, preferably 0.05 to 5 dl/g, and the softening temperature (TMA) thereof measured by a thermomechanical analyzer is in the range of 70° C. or more, preferably 90° to 25° C. and more preferably 100° to 200° C.

It is preferred to use as the cyclic olefinic random copolymers (a) composing the composition of the invention those having a glass transition temperature (Tg) in the range of usually 50° to 230° C., preferably 70° to 210° C.; a crystallinity in the range of 0 to 10%, preferably 0 to 7%, particularly preferably 0 to 5% which is measured by the X-ray diffraction method; and a thermal decomposition temperature in the range of usually 350° to 420° C., preferably 370° to 400° C.

Further, it is prefered to use as the cyclic olefinic random copolymers (a) those having as their mechanical properties a flexural modulus in the range of usually $1 \times 10^4$ to $5 \times 10^4$ kg/cm$^2$ and a flexural yield strength in the range of usually 300 to 1500 kg/cm$^2$.

Further, it is preferred to use as the cyclic olefinic random copolymers (a) those having a density in the range of usually 0.86 to 1.10 g/cm$^3$, preferably 0.88 to 1.08 g/cm$^3$; a refractive index (ASTM D 542) in the range of usually 1.47 to 1.58, preferably 1.48 to 1.56; and in respect of the copolymers being substantially amorphous a haze (ASTM D 1003) of usually 20% or less, preferably 10% or less.

Further, it is preferred to use as the cyclic olefinic random copolymer (a) those having as their electrical properties a dielectric constant (ASTM D 150) (1 kHz) in the range of 1.5 to 3.0, preferably 1.9 to 2.6, and a dielectric loss tangent in the range of $9 \times 10^{-4}$ to $8 \times 10^{-5}$, preferably $3 \times 10^{-4}$ to $9 \times 10^{-5}$.

Although there may be used as the cyclic olefinic random copolymers (a) in the invention copolymers consisting only of those having the physical properties in the above range, it is also possible to use copolymers wherein copolymers having the physical properties out of the above range are partially contained and in this case it is required that the physical properties of the copolymer as a whole fall within the above ranges.

The cyclic olefinic random copolymer (a) to be used in the invention can be prepared by polymerizing an ethylenic component, a cyclic olefinic component represented by the above general formula [I] and, if necessary, another copolymerizable monomer component in the presence of a well-known Ziegler catalyst.

There may, for example, be mentioned as the above Ziegler catalysts (a) a catalyst consisting of a complex containing at least magnesium, titanium and halogen, and an organoaluminum compound; (b) a catalyst consisting of a vanadium compound and an organoaluminum compound; etc. Among them is preferred the latter catalyst of (b), particularly a catalyst consisting of a soluble vanadium compound and an organoaluminum compound.

The preparation methods of the cyclic olefinic random copolymer (a) are specifically disclosed in Japanese Laid-Open Patent Publication Nos. 168708/1985, 120816/1986, 115912/1986, 115916/1986, 271308/1986, 272216/1986, 252406/1987, 252407/1987, etc.

It is also possible to use as [A] component in the invention the ring-opened polymer of the cyclic olefinic component represented by the above general formula [I] or a hydrogenated derivative of the ring-opened polymer (b) in place of the above cyclic olefinic random copolymer (a), and in that case effects equal to the former copolymer (a) can be obtained. In this case flame retardant cyclic olefinic polymer compositions having similar characteristics to those from the cyclic olefinic random copolymers (a) can be obtained according to a similar method to that using the copolymers (a). Such ring-opened polymers of the cyclic olefins are disclosed for example in Japanese Laid-Open Patent Publication No. 26024/1985.

In the ring-opened polymers before hydrogenation of the above ring-opened polymer or a hydrogenated derivative (b), the cyclic olefinic component represented by the above general formula [I] mainly forms the repetition unit of structure represented by the following general formula [III], and in the ring-opened polymer after hydrogenation the cyclic olefinic component mainly forms the repetition unit of structure represented by the following general formula [IV]:

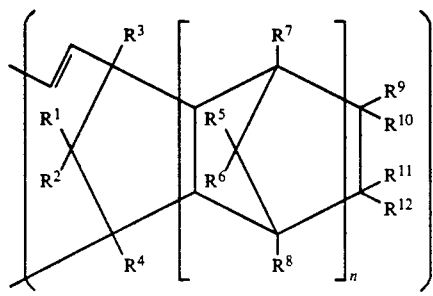

[III]

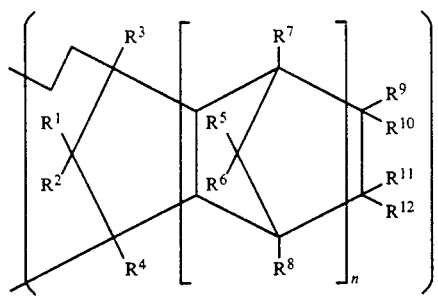

[IV]

(wherein n and $R^1$ to $R^{12}$ are as defined above).

The ring-opened polymer before hydrogenation can be prepared according to a usual ring-opening polymerization method of cyclic olefins using a monomer component selected from the above general formula [I] and if necessary the range of 0° to 180° C., preferably 20° to 100° C. Hydrogenation rate can be adjusted by the hydrogen pressure, reaction temperature, reaction time, catalyst concentration and the like. It is preferred in order that the hydrogenated product exhibits excellent heat deterioration resistance and photo-deterioration resistance that 50% or more, preferably 80% or more, more preferably 90% or more of the main chain double bonds in the polymer are hydrogenated.

A halogen type flame retardant [B] is compounded in the flame retardant cyclic olefinic polymer composition of the invention. Although various chlorine type and bromine type flame retardants can be used as the halogen type flame retardants [B], it is preferred to use the following compounds from the aspect of flame retardancy effect, heat resistance during molding, dispersibility into resins, influence onto physical properties of resins and the like: hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and its derivatives [for example, tetrabromobisphenol A-bis (hydroxyethyl ether), tetrabromobisphenol A-bis(2,3-dibromopropyl ether), tetrabromobisphenol A-bis(bromoethyl ether), tetrabromobisphenol A-bis(allyl ether), etc.], tetrabromobisphenol S and its derivatives [for example, tetrabromobisphenol S-bis(hydroxyethyl ether), tetrabromobisphenol S-bis(2,3-dibromopropyl ether), etc.], tetrabromophthalic anhydride and its derivatives [for example, tetrabromophthalimide, ethylenebistetrabromophthalimide, etc.], ethylenebis(5,6-dibromonorbornene-2,3-dicarboxyimide), tris-(2,3-dibromopropyl-1) isocyanurate, adducts by Diels-Alder reaction of hexachlorocyclopentadiene, tribromophenyl glycidyl ether, tribromophenyl acrylate, ethylenebistribromophenyl ether, ethylenebispentabromophenyl ether, tetradecabromodiphenoxybenzene, brominated polysary another polymerizable monomer component as starting materials. There can, for example, be used as the polymerization catalyst a system comprising a halide, nitrate or acetylacetone compound of ruthenium, rhodium, palladium, osmium, iridium, platinum, molybdenum, tungsten or the like together with a reducing agent such as an alcohol or tin compound; a system comprising a halide, acetylacetone compound or the like of titanium, vanadium, zirconium, tungsten, molybdenum or the like together with an organoaluminum compound or the like; or the like.

An hydrogenated derivative of the above ring-opened polymer can be obtained by hydrogenating the ring-opened polymer obtained according to the above methods. Hydrogenation of the ring-opened polymer can be carried out according to a usual hydrogenation method.

There may generally be used as the hydrogenation catalysts those used for hydrogenation of olefin compounds. There may specifically be used as a heterogenous catalyst nickel, palladium, platinum or the like, or a solid catalyst wherein such a metal is borne on a carrier such as carbon, silica, diatom earth, alumina or titanium oxide, for example, nickel/silica, nickel/diatom earth, palladium/carbon, palladium/silica, palladium/diatom earth, palladium/alumina, ets. Further, there may be used as a homogenous catalyst one whose base is a metal of Group VIII in the periodic table, for example, a catalyst comprising a nickel or cobalt compound together with an organometal compound of a metal of Group I, II or III in the periodic table such as nickel naphthenate/triethylaluminum, cobalt octenoate/n-butyllithium or nickel acetylacetate/triethylaluminum; a rhodium compound; or the like.

The hydrogenation reaction of the ring-opened polymer is carried out in a homogeneous or heterogenous system in accordance with the kind of the catalyst under a hydrogen pressure of 1 to 150 atm at a temperature in stynene, brominated polyphenylene oxide, brominated epoxy resins, brominated polycarbonate, polypentabromobenzyl acrylate, octabromonaphthalene, hexabromocyclododecane, bis(tribromophenyl)fumaramide, N-methylhexabromodiphenylamine, etc.

Among them are particularly preferred hexabromobenzene, hexabromodiphenyl oxide, octabromodiphenyl oxide, decabromodiphenyl oxide, tetrabromobisphenol S and its derivatives, tetrabromophthalic anhydride and its derivatives, ethylenebis(5,6-dibromonorbornene-2,3-dicarboxyimide), tris-(2,3-dibromopropyl-1) isocyanurate, adducts by Diels-Alder reaction of hexachlorocyclopentadiene, ethylenebistribromophenyl ether, ethylenebispentabromophenyl ether, tetradecabromodiphenoxybenzene, brominated polystyrene, brominated polyphenylene oxide, brominated epoxy resins, brominated polycarbonate, polypentabromobenzyl acrylate, bis(tribromophenyl)fumaramide and N-methylhexabromodiphenylamine.

It is preferred that such a halogen type flame retardant [B] is compounded in an amount of 3 to 50 wt. parts, preferably 5 to 40 wt. parts per 100 wt. parts of [A] component.

An antimony type flame retardant [C] is compounded in the flame retardant cyclic olefinic polymer composition of the invention as a flame retardancy aid for making the halogen type flame retardant [B] further effectively display a flame retardant effect. There may, for example, be used as the antimony type flame retardant [C] antimony trioxide, antimony pentaoxide, rodium antimonate, antimony trichloride, etc.

It is preferred that such as antimony type flame retardant [C] is compounded in an amount of 1 to 30 wt. parts, preferably 2 to 20 wt. parts per 100 wt. parts of [A] component.

In addition to the above halogen type flame retardant [B] and antimony type flame retardant [C], polytetrafluoroethylene [D] is compounded in the flame retardant cyclic olefinic polymer composition of the invention as an anti-dropping agent for preventing droping of the molten resin during combustion and thereby further enhancing flame retardancy.

It is preferred that polytetrafluoroethylene [D] is compounded in an amount of 0.01 to 5 wt. parts, preferably 0.1 to 4 wt. parts per 100 wt. parts of [A] component.

Further, it is possible to compound in the flame retardant cyclic olefinic polymer composition as

[E] component at least one copolymer selected from (a) an amorphous or low crystalline alpha-olefinic copolymer which is formed from at least two alphaolefins, and (b) an amorphous or low crystalline copolymer which contains as one of monomer constituents styrene or its derivative and has at least one of glass transition temperatures of 0° C. or less in an amount of 5 to 100 wt. parts, preferably 5 to 50 wt. parts per 100 wt. parts of [A] component.

[E] component is detailedly described below.

It is possible to use as [E] components (a) amorphous or low crystalline alpha-olefinic copolymers which are formed from at least two alpha-olefins (hereinafter sometimes referred to as alpha-olefinic copolymers), for example, ethylene-propylene copolymer, propylene-butene-1 copolymer, propylene-isobutylene copolymer, copolymers of ethylene or propylene with a diene, etc.; or blends of these polymers, graft polymers wherein an unsaturated carboxylic acid or derivative or the like is grafted to such a polymer block copolymers of these polymers; and the like, (b) amorphous or low crystalline copolymers which contain as one of monomer constituents styrene or its derivative and have at least one of glass transition temperatures of 0° C. or less (hereinafter sometimes referred to as styrene type copolymers), for example, styrene-isobutylene copolymer, styrene-butadiene copolymer, etc.

When one of the alpha-olefins in the alpha-olefinic copolymer (a) is ethylene, the molar ratio of ethylene to the other alpha-olefin (ethylene/alpha-olefin) varies depending on the kind of the alpha-olefin, etc., but it is generally preferred that the molar ratio is 50/50 to 95/5. It is preferred that the molar ratio is 50/50 to 90/10 in case of the alpha-olefin being propylene and 60/40 to 95/5 in case of the alpha-olefin having 4 or more carbon atoms.

Further, when the alpha-olefin on the one hand is propylene, namely in propylene-alpha-olefin copolymers, the molar ratio of propylene to the alpha-olefin other than the propylene (propylene/alpha-olefin) varies depending on the kind of alpha-olefin, etc., but it is generally preferred that the molar ratio is 50/50 to 95/5.

It is desirable that such alpha-olefinic copolymers have a crystallinity in the range of 0 to 50%, preferably 0 to 25% measured by the X-ray diffraction method, and a limiting viscosity of 0.2 to 10 dl/g, preferably 1 to 7 dl/g measured in decalin of 135° C.

Further, there may preferably be used as the alpha-olefin diene copolymers among the alpha-olefinic copolymers (a) ethylene-alpha-olefin-diene copolymers and propylene-alpha-olefin-diene copolymers.

There can usually be exemplified as the alpha-olefin composing the ethylene-alpha-olefin-diene copolymer an alpha-olefin having 3 to 20 carbon atoms such as propylene, 1-butene, 1-pentene, 1-hexene, 4-methyl-1-pentene, 1-octene or 1-decene or a mixture thereof or the like. Particularly preferred among them are alpha-olefins having 3 to 10 carbon atoms.

There can usually be exemplified as the alpha-olefin composing the propylene-alpha-olefin-diene copolymer an alpha-olefin having 4 to 20 carbon atoms such as 1-butene, 1-pentene, 1-hexene, 4-methyl-1-pentene, 1-octene or 1-decene or a mixture thereof or the like. Particularly preferred among them are alpha-olefins having 4 to 10 carbon atoms.

Further, there can be exemplified as the diene component in the ethylene-alpha-olefin-diene copolymer or propylene-alpha-olefin-diene copolymer a chain non-conjugated diene such as 1,4-hexadiene, 1,6-octadiene, 2-methyl-1,5-hexadiene, 6-methyl-1,5-heptadiene or 7-methyl-1,6-octadiene; a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene or 6-chloromethyl-5-isopropenyl-2-norbornene; 2,3-di-isopropylidene-5-norbornene; 2-ethylidene-3-isopropylidene-5-norbornene; 2-propenyl-2,2-norbornadiene; etc.

The molar ratio of ethylene to the alpha-olefin (ethylene/alpha-olefin) in the above ethylene-alpha-olefin-diene copolymer varies depending on the alpha-olefin, etc., but it is generaly preferred that the molar ratio is 50/50 to 95/5. Further, it is preferred that the content of the diene component in the copolymer rubber is usually 1 to 20 mol %, preferably 2 to 15 mol %.

The molar ratio of propylene to the alpha-olefin (propylene/alpha-olefin) in the above propylene-alpha-olefin-diene copolymer rubber varies depending on the kind of the alpha-olefin, etc., but it is generally preferred that the molar ratio is 50/50 to 95/5. Further, it is desirable that the content of the diene component in the copolymer is 1 to 20 mol %, preferably 2 to 15 mol %.

There may be used as the styrene type copolymers (b) styrene-butadiene block copolymer rubbers, styrene-butadiene-styrene block copolymer rubbers, styrene-isoprene block copolymer rubbers, styrene-isoprene-styrene block copolymer rubbers, hydrogenated styrene-butadiene-styrene block copolymer rubbers, hydrogenated styrene styrene-isoprene-styrene block copolymer rubbers, styrene-butadiene random copolymer rubbers, etc.

In these copolymer rubbers, it is generally preferred that the molar ratio of styrene to the conjugated diene (styrene/conjugated diene) is 10/90 to 70/30.

The hydrogenated styrene-butadiene-styrene block copolymer rubber is a copolymer rubber obtained by partially or wholly hydrogenating the double bonds remaining in the above styrene-butadiene-styrene block copolymer rubber.

The hydrogenated styrene-isoprene-styrene block copolymer rubber is a copolymer rubber obtained by partially or wholly hydrogenating the double bonds remaining in the above styrene-isoprene-styrene block copolymer rubber.

It is preferred that the above soft resin or rubber-like material has a glass transition temperature (Tg) of 0° C. or less, preferably −10° C. or less, further preferably −20° C. or less; a limiting viscosity [η] in the range of 0.01 to 10 dl/g, preferably 0.08 to 7 dl/g; and a crystallinity in the range of 0 to 10%, preferably to 7%, particularly preferably 0 to 5% measured by the X-ray diffraction method.

These soft resins or rubber-like components may be used alone or in combination of two or more of them.

It is preferred in the invention that the melt flow index (MFR; ASTM D 1238 Condition L) of the flame retardant cyclic olefinic polymer composition to which component is added is 0.1 to 100.

Polymers of the following (c) to (r) and the like may further be compounded besides the above copolymers:

(c) a halogen-containing vinyl polymer, specifically polyvinyl chloride, polyvinylidene chloride, polyvinyl fluoride, polychloroprene, chlorinated rubber or the like, (d) a polymer derived from an alpha, beta-unsaturated carboxylic acid or its derivative, specifically polyacrylate, polymethacrylate, polyacrylamide, polyacrylonitrile or the like; or a copolymer of the monomer composing the above polymer and another copolymerizable monomer, specifically an acrylonitrile-butadiene-styrene copolymer, acrylonitrile-styrene copolymer, acrylonitrile-styrene-acrylate copolymer or the like, (e) a polymer derived from an unsaurated alcohol, an unsaturated amine, an acyl derivative thereof or an acetal, specifically polyvinyl alcohol, polyvinyl acetate, polyvinyl stearate, polyvinyl benzoate, polyvinyl maleate, polyvinyl butyral, polyallyl phthalate, polyallylmelamine or the like; or a copolymer of the monomer composing the above polymer and another copolymerizable monomer, specifically an ethylene-vinyl acetate copolymer or the like, (f) a polymer derived from an epoxide, specifically polyethylene oxide, a polymer derived from bisglycidyl ether or the like, (g) a polyacetal, specifically polyoxymethylene, polyoxyethylene; polyoxymethylene containing ethylene oxide as a comonomer; or the like, (h) polyphenylene oxide, (i) polycarbonate, (j) polysulfone, (k) polyurethane or a urea resin, (l) a polyamide or copolyamide derived from a diamine and a dicarboxylic acid and/or an aminocarboxylic acid or a corresponding lactam, specifically nylon 6, nylon 66, nylon 11, nylon 12 or the like, (m) a polyester derived from a dicarboxylic acid and a dialcohol and/or an oxycarboxylic acid or a corresponding lactone, specifically polyethylene terephthalate, polybutylene terephthalate, poly-1,4-dimethylolcyclohexane terephthalate or the like, (n) a polymer which is derived from an aldehyde with phenol, urea or melamine and has a crosslinking structure, specifically a phenol-formaldehyde resin, urea-formaldehyde resin, melamine-formaldehyde resin or the like, (o) a natural polymer, specifically cellulose, rubber or a protein, or a derivative thereof such as cellulose acetate cellulose propionate or cellulose ester, (p) an alkyd resin, specifically glycerin-phthalic acid resin, etc., (q) an unsaturated polyester resin or halogen-containing modified resin which is derived from a copolyester of saturated and unsaturated dicarboxylic acids with a polyalcohol and obtained using a vinyl compound as a crosslinking agent, (r) a addition copolymer of a cyclic olefin of the above general formula [I] and ethylene, and if necessary an alpha-olefin other than ethylene or/and a cyclic olefin other than that of the general formula [I] which is rubber-like and has a glass transition temperature of 0° C. or less.

Magnesium hydroxide [F] can be compounded to the flame retardant olefinic polymer composition of the invention comprising [A] to [D] components or [A] to [E] components. The compounding amount of magnesium hydroxide [F] is 2 to 150 wt. parts, preferably 5 to 100 wt. parts per 100 wt. parts of [A] component. It is possible by addition of magnesium hydroxide [F] to reduce the compounding amount of [B], [C] and [D] components, particularly [B] and [C] components.

In the invention it is possible, if appropriate, to subject the flame retardant cyclic olefinic polymer composition to a crosslinking reaction in the presence of an organic peroxide. The crosslinking reaction can be carried out after all the components are compounded, or alternatively it is also possible to adopt, for example a method wherein the crosslinking reaction is carried out after mixing of [A] and [E] components and then the remaining components are compounded.

There may be mentioned as the organic peroxides to be used in the crosslinking reaction ketone peroxides such as methyl ethyl ketone peroxide and cyclohexanone peroxide; peroxyketals such as 1,1-bis(t-butylperoxy)-cyclohexane and 2,2-bis(t-butylperoxy) octane; hydroperoxides such as t-butyl hydroperoxide, cumene hydroperoxide, 2,5-dimethylhexane-2,5-dihydroxyperoxide and 1,1,3,3-tetramethylbutyl hydroperoxide; dialkyl peroxides such as di-t-butyl peroxide, 2,5-dimethyl-2,5-di(t-butylperoxy)hexane and 2,5-dimethyl-2,5-di(t-butylperoxy)-hexyne-3; diacyl peroxides such as lauroyl peroxide and benzoyl peroxide; peroxyesters such as t-tutyl peroxyacetate, t-butyl peroxybenzoate and 2,5-dimethyl-2,5-di(benzoylperoxy)hexane; etc.

The compounding amount of the organic peroxide is 0.01 to 1 wt. part, preferably 0.05 to 0.5 wt. part par 100 wt. parts of the total of [A] and [E] components.

It is preferred to compound in carrying out the crosslinking reaction a compound having two or more radically polymerizable functional groups in the molecule for the purpose of enhancement of crosslinking efficiency, and thereby a composition excellent in impact resistance, particularly in impact resistance at low temperature can be obtained.

Examples of compounds having two or more radically polymerizable functional groups in the molecule include divinylbenzene, vinyl acrylate, vinyl methacrylate, etc. These compounds can be used in an amount of 1 wt. part or less, preferably 0.1 to 0.5 wt. part per 100 wt. parts of the total of [A] and [E] components.

There can be compounded to the flame retardant cyclic olefinic polymer composition of the invention in order to further enhance its flame retardancy an inorganic flame retardant such as aluminum hydroxide, calcium hydroxide, zirconium hydroxide, magnesium carbonate, calcium aluminate, hydrated plaster, zinc borate or barium metaborate. These inorganic flame retardants are preferably compounded in an amount of 5 to 100 wt. parts per 100 wt. parts of [A] component.

The flame retardant cyclic olefinic polymer composition can be prepared by a known method, for example by melting and mixing respective components in an extruder, etc.

Further, there can be compounded in the flame retardant cyclic olefinic polymer compound of the invention in an amount such that the object of the invention is not spoiled a heating stabilizer, weathering stabilizer, antistatic agent, slipping agent, anti-blocking agent, antifogging agent, lubricant, dye, pigment, natural oil, synthesized oil, wax, or organic or inorganic filler, or the like, and the compounding rate of these additives may appropriately be varied. Specific examples of the stabilizers to be compounded as optional components include phenolic antioxidants such as tetrakis [methylene-3-(3,5-di-t-butyl-4-hydroxyphenyl)propionate]methane, beta-(3,5-di-t-butyl-4-hydroxyphenyl)propionic acid alkyl ester and 2,2'-oxamidebis[ethyl-3-(3,5-di-t-butyl-4-hydroxyphenyl) propionate]; phosphite type stabilizers such as tris(nonylphenyl) phosphite and tris(2,4-di-t-butylphenyl) phosphite; fatty acid metal salts such as zinc stearate, calcium stearate and calcium 12-hydroxystearate; polyalcohol esters of fatty acid such as glycerin monostearate, glycerin monolaurate, glycerin distearate, pentaerithritol monostearate, pentaerithritol distearate and pentaerithritol tristearate; synthetic hydrotalcite; epoxy compounds; etc. These stabilizers may be compounded alone or in combination, for example in combination of tetrakis[methylene-3-(3,5-di-t-butyl-4-hydroxyphenyl)propionate] methane with zinc stearate and glycerin monostearate.

Further, examples of the organic or inorganic fillers include silica, diatom earth, alumina, titanium oxide, magnesium oxide, pumice powder, pumice balloon, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide, polyethylene fiber, polypropylene fiber, polyamide fiber, etc.

Mixing of the flame retardant cyclic olefinic polymer composition of the invention with other components can be carried out by a known method, for example by simultaneously mixing respective components.

The flame retardant cyclic olefinic polymer composition of the invention can readily be molded in an optional molding method such as extrusion molding or injection molding, and can be used in the same uses with the usual compositions, for example for molded resin articles, but its characteristics are adequately displayed when it is utilized in the housings or parts of electrical products, household appliances, OA apparatuses, etc. wherein flame retardancy is particularly necessitated.

Flame retardant cyclic olefinic polymer compositions obtained by the invention, wherein a halogen type flame retardant, an antimony type flame retardant and polytetrafluoroethylene, and if appropriate a component such as an alpha-olefinic copolymer or styrene type copolymer and/or magnesium hydroxide are compounded to a polymer [(A) component] which is composed of specific cyclic olefinic component, are excellent both in flame retardancy and in heat resistance, chemical resistance, solvent resistance, dielectric property, electrical properties, rigidity, impulse resistance, dimensional stability, moldability and mechanical properties such as flexural strength and flexural modulus, etc.

EXAMPLE

Examples of the invention is described below.

EXAMPLE 1

Ethylene-tetracyclo [$4.4.0.1^{2,5}.1^{7,10}$]-3-dodecene copolymer (ethylene content 70 mol %, melt flow index measured with a load of 2.16 kg at 260° C., 20 g/10 min, hereinafter sometimes abbreviated as E-TCD copolymer) (100 wt. parts), 15.2 wt. parts of decabromodiphenyl oxide (made by Marubishi Yuka Co., Ltd., trade name NONNEN DP-10F), 4,5 wt. parts of antimony trioxide (made by Sumitomo Kinzoku Kozan Co., Ltd.), 30 wt. parts of magnesium hydroxide (made by Kyowa Kagaku Co., Ltd, trade name KISUMA 5A) and 1.5 wt. parts of polytetrafluoroethylene powder (made by Mitsui-Du pont Floro Chemical Co., Ltd., trade name TEFLON 6J) were mixed, and melted and mixed in a biaxial extruder having a screw size of 45 mm at 230° C. to obtain a pellet.

This pellet was injection molded at a cylinder temperature of 230° C. and an injection die temperature of 60° C. to obtain specimens for various evaluations. Various physical properties were determined using these specimens, and the results are shown in Table 2.

Measurement of various physical properties was conducted under the following conditions: combustibility: Tested by UL-94 standard using a specimen 1/16 inch thick.

That is, 10 specimens each having a predetermined size were prepared per one sample, and a vertical flame test was conducted as follows.

The upper end of the specimen is fixed by a clamp to vertically set the specimen, predetermined flame is applied to the lower end for 10 seconds and detached therefrom, and the combustion time of the specimen (first time) is measured.

Immediately after the fire goes out, predetermined flame is again applied to the lower end for 10 seconds and detached, and the combustion time of the specimen (second time) is measured.

The same measurement is repeated for 5 specimens to obtain 10 in total of combustion time data, namely 5 data of the first time plus 5 data of the second time.

The total of 10 data is expressed by T and the maximum value among the 10 data is expressed by M.

Evaluation was made according to the following evaluation criterion;

V-0: T is 50 seconds or less, M is 10 seconds or less, flame does not reach the clamp, and when the melted specimen with flame drops, the cotton 12 inches thereunder does not ignite.

V-1: T is 250 seconds or less, M is 30 seconds or less, and other conditions which are the same as in V-0 are satisfied.

V-2: T is 250 seconds or less, M is 30 seconds or less, flame does not reach the clamp, and when the melted specimen with flame drops, the cotton 12 inches thereunder ignites.

V-2: failure, none of the above evaluations is satisfied.
Melt flow index: ASTM D 1238
Izod impact strength (with notch): ASTM D 256
Flexural strength, flexural modulus: ASTM D 790
Heat distortion temperature: ASTM D 648

EXAMPLE 2

Ethylene-tetracyclo [4.4.0.1$^{2,5}$.1$^{7,10}$]-3-dodecene copolymer (ethylene content 70 mol %, load 2.16 kg. melt flow index measured at 260° C., 20 g/10 min (80 wt. parts), 20 wt. parts of ethylene-propylene copolymer (ethylene content 80 mol %. load 2.16 kg, melt flow index measured at 190° C., 0.4 g/10 min), 15.2 wt. parts of decabromodiphenyloxide, 4,5 wt. part of antimony trioxide, 30 wt. parts of magnesium hydroxide and 1.5 parts of polytetrafluoroethylene powder were mixed, and melted and mixed by a biaxial extender having a screw size of 45 mm at 230° C. to obtain a pellet.

This pellet was subjected to the same tests as in Example 1. The results are shown in Table 2.

EXAMPLE 3

Ethylene-tetracyclo [4.4.0.1$^{2,5}$.1$^{7,10}$]-3-dodecene copolymer (ethylene content 70 mol %, load 2.16 kg. melt flow index measured at 260° C., 20 g/10 min) (80 wt. parts), 20 wt. parts of ethylene-propylene copolymer (ethylene content 80 mol %, load 2.16 kg. melt flow index measured at 190° C., 0.4 g/10 min), 0.3 wt. part of divinylbenzene and 0.1 wt. part of 2,5-demethyl-2,5-di(t-butylperoxy)hexyne-3 were mixed, and melted and mixed by a biaxial extruder having a screw size of 45 mm at 230° C. to obtain a pellet.

Decabromodiphenyl oxide (15.2 wt. part), 4.5 wt. parts of antimony trioxide, 30 wt. parts of magnesium hydroxide and 1.5 wt. parts of polytetrafluoroethylene powder were mixed with 100 wt. parts of this pellet, and melted and mixed again in the same conditions as above to obtain a pellet.

This pellet was subjected to the same tests as in Example 1. The results are shown in Table 2.

EXAMPLE 4

The procedures of Example 2 were repeated except that styrene-ethylene-butadiene-styrene block copolymer (made by Shell Chemicals Co., Ltd., trade name KRATON G 1652) was used in place of the ethylene-propylene copolymer. The results are shown in Table 2.

EXAMPLE 5

The procedures of Example 3 were repeated except that magnesium hydroxide was not used and the addition amounts of the other flame retardant components were changed to those shown in Table 2. The results are shown in Table 2.

COMPARATIVE EXAMPLE 1

The procedures of Example 1 were repeated except that decabromodiphenyl oxide, antimony trioxide, magnesium hydroxide and polytetrafluoroethylene were not added. The results are shown in Table 2.

COMPARATIVE EXAMPLE 2

The procedures of Example 2 were repeated except that decabromodiphenyl oxide, antimony trioxide, magnesium hydroxide and polytetrafluoroethylene were not added. The results are shown in Table 2.

COMPARATIVE EXAMPLE 3

The procedures of Example 3 were repeated except that decabromodiphenyl oxide, antimony trioxide, magnesium hydroxide and polytetrafluoroethylene were not added. The results are shown in Table 2.

COMPARATIVE EXAMPLE 4

The procedures of Example 3 were repeated except that polytetrafluoroethylene was not used and the addition amounts of the other flame retardant components was changed to these shown in Table 2. The results are shown in Table 2.

COMPARATIVE EXAMPLE 5

The E-TCD copolymer used in Example 1 (100 wt. parts), 27.4 wt. parts of decabromodiphenyl oxide and 9.6 wt. parts of antimony trioxide were mixed, and melted and mixed by a biaxial extruder having a screw size of 45 mm at 230° C. to obtain a pellet.

This pellet was subjected to the same tests as in Example 1. The results are shown in Table 2.

TABLE 2

| | Polymer component (wt. parts) | | Flame retardant component (wt. parts) | | | | Combusti-bility | Physical properties | | | |
| | E-TCD *2 copolymer | Rubber component | DBPO *3 | Sb₂O₃ | Mg(OH)₂ | PTFE *4 | | Impulse strength (kg.cm/cm) *7 | Flexural strength (kg/cm²) | Flexural modulus (kg/cm²) | Heat distortion temperature (°C.) |
|---|---|---|---|---|---|---|---|---|---|---|---|
| Example 1 | 100 | — | 15.2 | 4.5 | 30 | 1.5 | V-0 | 1 | 800 | 31500 | 115 |
| Example 2 | 80 | EPR 20 *5 | 15.2 | 4.5 | 30 | 1.5 | V-0 | 10 | 750 | 29600 | 88 |
| Example 3 *1 | 80 | EPR 20 | 15.2 | 4.5 | 30 | 1.5 | V-0 | 25 | 700 | 29400 | 90 |
| Example 4 | 80 | SEBS 20 *6 | 15.2 | 4.5 | 30 | 1.5 | V-0 | 30 | 680 | 28500 | 89 |
| Example 5 *1 | 80 | EPR 20 | 28 | 9.8 | — | 1.5 | V-0 | 30 | 700 | 27500 | 90 |
| Comparative Ex. 1 | 100 | — | — | — | — | — | V-2 | 2 | 760 | 27500 | 115 |
| Comparative Ex. 2 | 80 | ERP 20 | — | — | — | — | V-2 failure | 20 | 700 | 27000 | 89 |
| Comparative Ex. 3 *1 | 80 | ERP 20 | — | — | — | — | V-2 failure | 40 | 580 | 26500 | 90 |
| Comparative Ex. 4 *1 | 80 | ERP 20 | 17.5 | 5.3 | 52.6 | — | V-2 | 20 | 720 | 28500 | 89 |
| Comparative Ex. 5 | 100 | — | 27.4 | 9.6 | — | — | V-2 | 1 | 750 | 31000 | 115 |

*1 Crosslinked polymer component was used.
*2 E-TCD copolymer: Ethylene-tetracyclo[4.4.0.1$^{2,5}$.1$^{7,10}$]-3-dodecene copolymer
*3 DBPO: Decabromodiphenyl oxide
*4 PTFE: Polytetrafluoroethylene
*5 EPR: Ethylene-propylene copolymer
*6 SEBS: Styrene-ethylene-butadiene-styrene block copolymer
*7 Izod impact strength (with notch)

It is seen from the results of Table 2 flame retardance is enhanced by compounding decabromodiphenyl oxide [halogen type flame retardant (B)], antimony trioxide [antimony type flame retardant (C))] and polytetrafluoroethylene (D) to the polymer component.

It is further understood that compounding of rubber component [E] as a polymer component bring about impact strength.

Further, it is understood that compounding of magnesium hydroxide [E] enables the reduction of compounding amount of decabromodiphenyl oxide and antimony trioxide.

We claim:

1. A flame retardant cyclic olefinic polymer composition which comprises (A) a cyclic olefinic random copolymer formed from an ethylenic component and a cyclic olefinic component represented by the following general formula (I), or (b) a ring-opened polymer of a cyclic olefinic component represented by the following general formula (I) or a hydrogenated derivative of the polymer which copolymer or polymer has a limiting viscosity ($\eta$) of 0.01 to 10 dl/g measured in decalin at 135° C. and a softening temperature (TMA) of 70° C. or more;

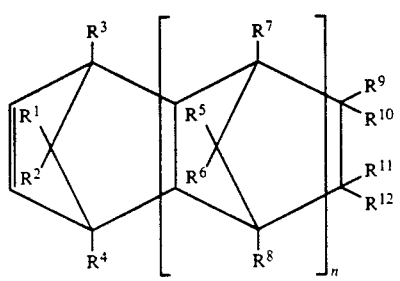

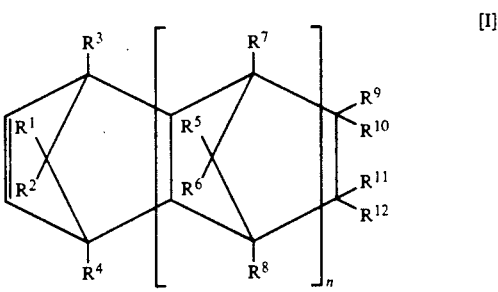

wherein, $R^1$ to $R^{12}$ is a hydrogen atom, hydrocarbon group or halogen atom and may be the same or different, or $R^9$ and $R^{10}$, or $R^{11}$ and $R^{12}$ may combine to form a divalent hydrocarbon group, or $R^9$ or $R^{10}$ together with $R^{11}$ or $R^{12}$ may form a ring; and n is 0 or a positive integer, and when $R^5$ to $R^8$ are plurally repeated, n"n"s may be the same or different;

(B) a halogen containing flame retardant,
(C) an antimony containing flame retardant,
(D) polytetrafluoroethylene, and wherein 3 to 50 wt. parts of (B) component, 1 to 30 wt. parts of (C) component and 0.01 to 5 wt. parts of (D) component are compounded per 100 wt. parts of (A) components and
(E) at least one copolymer selected from the group consisting of an amorphous or low crystalline alpha-olefinic copolymer which is formed from at least two alpha-olefins, and an amorphous or low crystalline copolymer which contains as one of monomer constituents styrene or its derivative and has at least one of glass transition temperature of 0° C. or less, and
wherein 5 to 100 wt. parts of (E) component is compounded per 100 wt. parts of (A) component.

2. The flame retardant cyclic olefinic polymer composition of claim 1, which further contains

[F] magnesium hydroxide, and
wherein 2 to 150 wt. parts of [F] components is compounded per 100 wt. parts of [A] components.

3. A flame retardant cyclic olefinic polymer composition of claim 1 which comprises (A)
(a) a cyclic olefinic random copolymer formed from an ethylenic component and a cyclic olefinic component represented by the following general formula (I), or
(b) a ring-opened polymer of a cyclic olefinic component represented by the following general formula (I) or a hydrogenated derivative of the polymer which copolymer or polymer has a limiting viscosity ($\eta$) of 0.05 to 5 dl/g measured in decalin at 135° C. and a softening temperature (TMA) of 90° to 250° C.;

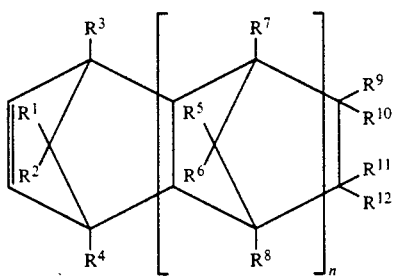

wherein, $R^1$ to $R^{12}$ is a hydrogen atom, hydrocarbon group or halogen atom and may be the same or different, or $R^9$ and $R^{10}$, or $R^{11}$ and $R^{12}$ may combine to form a divalent hydrocarbon group, or $R^9$ or $R^{10}$ together with $R^{11}$ or $R^{12}$ may form a ring and n is 0 or a positive integer, and when $R^5$ to $R^8$ are plurally repeated, n"n"s may be the same or different;

(B) a halogen containing flame retardant,
(C) an antimony containing flame retardant,
(D) polytetrafluoroethylene, and
(E) at least one copolymer selected from the group consisting of an amorphous or low crystalline alpha-olefinic copolymer which is formed from at least two alpha-olefins, and an amorphous or low crystalline copolymer which contains as one of monomer constituents styrene or its derivative and has at least one of glass transition temperatures of 0° C. or less, and wherein 5 to 40 wt. parts of (B) component, 2 to 20 wt. parts of (C) component, 0.1 to 4 wt. parts of (D) components, and 5 to 50 wt. parts of (E) components is compounded per 100 wt. parts of (A) component.

4. The flame retardant cyclic olefinic polymer composition of claim 3, which further contains
[F] magnesium hydroxide, and
wherein 5 to 100 wt. parts of [F] component is compounded per 100 wt. parts of [A] component.

5. The flame retardant cyclic olefinic polymer composition of claim 4 wherein the halogen containing flame retardant is hexabromobenzene, hexabromodiphenyl oxide, octabromodiphenyl oxide, decabromodiphenyl oxide, tetrabromobisphenol S or its derivative, tetrabromophthalic anydride or its derivative, ethylenebis(5,6-dibromonorbornene-2,3-dicarboxyimide), tris-(2,3-dibromopropyl-1)-isocyanurate, an adduct of hexachlorocyclopentadiene by Diels-Alder reaction, ethylenebistribromophenyl ether, ethylenebispentabromophenyl ether, tetradecabromodiphenoxybenzene, brominated polystyrene, brominated polyphenylene oxide, a brominated epoxy resin, a brominated polycarbonate, polypentabromobenzyl acrylate, bis(tribromophenyl)fumaramide, or N-methylhexabromodiphenylamine.

6. The flame retardant cyclic olefinic polymer composition of claim 4 wherein the halogen containing flame retardant is hexabromobenzene, hexabromodiphenyl oxide, octabromodiphenyl oxide, decabromodiphenyl oxide, tetrabromobisphenol S or its derivative, tetrabromophthalic anhydride or its derivative, ethylenebis(5,6-dibromonorbornene-2,3-dicarboxyimide), tris-(2,3-dibromopropyl-1)-isocyanurate, an adduct of hexachlorocyclopentadiene by Diels-Alder reaction, ethylenebistribromophenyl ether, ethylenebispentabromophenyl ether, tetradecabromodiphenoxybenzene, brominated polystyrene, brominated polyphenylene oxide, a brominated epoxy resin, a brominated polycarbonate, polypentabromobenzyl acryale, bid(tribromophenyl)fumaramide, or N-methylhexabromodiphenylamine.

7. The flame retardant cyclic olefinic polymer composition of claim 5 wherein the antimony containing flame retardant is antimony trioxide, antimony pentoxide, sodium antimonate or antimony trichloride.

8. The flame retardant cyclic olefinic polymer composition of claim 6 wherein the antimony containing flame retardant is antimony trioxide, antimony pentoxide, sodium antimonate or antimony trichloride.

9. A flame retardant cyclic olefinic polymer composition which comprises
(A) an ethylene-tetracyclo(4.4.0.1$^{2,5}$.1$^{7,10}$)-3-dodecene copolymer which has a limiting viscosity ($\eta$) of 0.05 to 5 dl/g measured in decalin at 135° C. and a softening temperature (TMA) of 90° to 250° C.,
(B) decabromodiphenyl oxide,
(C) antimony trioxide,
(D) polytetrafluoroethylene, and
(E) an ethylene-propylene copolymer, and
wherein 5 to 40 wt. parts of (B) component, 2 to 20 wt. parts of (C) component, 0.1 to 4 wt. parts of (D) component and 5 to 50 wt. parts of (E) component are compounded per 100 wt. parts of (A) component.

10. A flame retardant cyclic olefinic polymer composition which comprises
(A) an ethylene-tetracyclo(4.4.0.1$^{2,5}$.1$^{7,10}$)-3-dodecene copolymer which has a limiting viscosity ($\eta$) of 0.05 to 5 dl/g measured in decalin at 135° C. and a softening temperature (TMA) of 90° to 250° C.,
(B) decabromodiphenyl oxide,
(C) antimony trioxide,
(D) polytetrafluoroethylene, and
(E) a styrene-ethylene-butadiene-styrene block copolymer, and
wherein 5 to 40 wt. parts of (B) component, 2 to 20 wt. parts of (C) component, 0.1 to 4 wt. parts of (D) component and 5 to 50 wt. parts of (E) component are compounded per 100 wt. parts of (A) component.

11. The flame retardant cyclic olefinic polymer composition of claim 9, which further contains
[F] magnesium hydroxide, and
wherein 5 to 100 wt. parts of [F] component is compounded per 100 wt. parts of [A] component.

12. The flame retardant cyclic olefinic polymer composition of claim 10, which further contains
[F] magnesium hydroxide, and
wherein 5 to 100 wt. parts of [F] component is compounded per 100 wt. parts of [A] component.

* * * * *